US011716192B2

United States Patent
Samid

(10) Patent No.: US 11,716,192 B2
(45) Date of Patent: Aug. 1, 2023

(54) REPLICA: AN IMPROVED COMMUNICATION CONCEALMENT CIPHER

(71) Applicant: Gideon Samid, Rockville, MD (US)

(72) Inventor: Gideon Samid, Rockville, MD (US)

(*) Notice: Subject to any disclaimer, the term of this patent is extended or adjusted under 35 U.S.C. 154(b) by 0 days.

(21) Appl. No.: 18/088,718

(22) Filed: Dec. 26, 2022

(65) Prior Publication Data

US 2023/0138446 A1      May 4, 2023

Related U.S. Application Data

(63) Continuation-in-part of application No. 17/001,163, filed on Aug. 24, 2020, now Pat. No. 10,965,460, and a continuation-in-part of application No. 17/510,324, filed on Oct. 25, 2021, now Pat. No. 11,336,447, and a continuation-in-part of application No. 17/744,777, filed on May 16, 2022, now Pat. No. 11,539,519.

(60) Provisional application No. 63/292,594, filed on Dec. 22, 2021, provisional application No. 63/306,501, filed on Feb. 4, 2022.

(51) Int. Cl.
*H04L 9/06* (2006.01)

(52) U.S. Cl.
CPC ............ *H04L 9/0618* (2013.01); *H04L 9/065* (2013.01)

(58) Field of Classification Search
CPC ...................................................... H04L 9/0618
See application file for complete search history.

(56) References Cited

U.S. PATENT DOCUMENTS

| | | | |
|---|---|---|---|
| 8,472,619 B1* | 6/2013 | Trimberger | H04L 9/002 380/28 |
| 2014/0195816 A1* | 7/2014 | Mantin | G06F 21/602 713/189 |
| 2016/0219024 A1* | 7/2016 | Verzun | H04L 9/0662 |
| 2017/0250796 A1* | 8/2017 | Samid | H04L 9/0838 |

* cited by examiner

*Primary Examiner* — Bradley W Holder

(57) ABSTRACT

Replica is an encryption algorithm where security is based on lavish use of randomness rather than on mathematical complexity and the cipher is decoy-tolerant, namely it can readily distinguish between bona fide ciphertext bits and randomized meaningless bits. This attribute allows its users to project as much security as they care by mixing the message bits with more and more decoy bits. It also allows its user to conceal their pattern of communication in a fixed rate of message bit flow.

10 Claims, 2 Drawing Sheets

Replica: An Improved Communication Concealment Cipher
US Utility Patent Application * Drawings REPLICA Box Configuration

Replica: An Improved Communication Concealment Cipher

US Utility Patent Application * Drawings

REPLICA Box Configuration

Replica Pattern Concealment Communication

A Replica Pattern Concealing Conversation

REPLICA: AN IMPROVED COMMUNICATION CONCEALMENT CIPHER

CONTINUATION IN PART

Of U.S. patent application Ser. No. 17/744,777 filed May 16, 202

This application is also a continuation in part of U.S. patent application Ser. No. 17/510,324 filed Oct. 25, 2021, and it is also a continuation in part of U.S. patent application Ser. No. 17/216,274 filed Mar. 29, 2021, and also continuation in parts of U.S. application Ser. No. 17/001,163 filed 2020 Aug. 24, and also a continuation in part of U.S. patent application Ser. No. 16/855,517 filed Apr. 22, 2020, which is a continuation of application Ser. No. 16/687,690, which is a continuation of application Ser. No. 16/444,892.

THIS DEFINES A CONTINUATION ZONE ENCOMPASSING THE CURRENT APPLICATION AND applications Ser. Nos. 17/744,77, 17/510,324, 17/216,274, 17/001, 163, 16/855,517, 16/687,690, 16/444,892, AND ALL THE PROVISIONAL APPLICATIONS REFERENCED IN application Ser. No. 16/444,892, CROSS REFERENCED HERE:

Provisional Application No. 62/688,387 filed on Jun. 22, 2018; Provisional Application No. 62/689,890 filed on Jun. 26, 2018 ;Provisional Application No. 62/714,735 filed on Aug. 5, 2018; Provisional Application No. 62/782,301 filed on Dec. 19, 2018; Provisional Applications No. 62/805,369 filed on Feb. 14, 2019; Provisional Application No. 62/813, 281 filed on Mar. 4, 2019; Provisional Application No. 62/782,301 filed on Dec. 19, 2018; Provisional Application No. 62/813,281 filed 4$^{th}$ of March 2019; Provisional Application No. 62/850,720, filed May 21, 2019; Provisional Application No. 62/857,898 filed 6 Jun. 2019. Provisional application: 63/140,006 filed 2021 Jan. 21; No. 63/306,501 filed 2022 Feb. 4, No. 63/292,954 filed 2021 Dec. 22, No. 63/276,662, 2021 Nov. 8

This application also claims the priority of the following provisional applications: 63/306,501 filed Feb. 4, 2022

BRIEF SUMMARY OF THE INVENTION

This application builds on the continued application Ser. No. 16/687,690, "Effective Concealment of Communication Pattern (BitGrey, BitLoop)" presenting a cipher that can readily distinguish between ciphertext bits and non-ciphertexts bits, even if mixed together. This "decoy tolerance" attribute makes it a good cipher to deploy with the BitGrey and BitLoop protocols. The Replica is based on a bit operation where a feed bit string F is used to replicate a template bit string T, by copying from F bits according to the template T. If T is replicated when F was traversed exactly to its end, then T and F are said to be in a balanced template match. Such match will point F to T, so that if T is taken to represent a letter in an alphabet, then F will point to it. And since F can be constructed to be very much longer than T, it so happens that one builds a large as desired ciphertext to send a given size message. This allows one to transmit a fixed rate output string while hiding how much, if any, real communication took place. The Replica cipher is highly randomized, compelling its attacker to be limited to brute force attack, and moreover, it hides not only the contents of the communication but also its pattern. This is a big advantage over mainstay ciphers that reveal to their examiner the extent the frequency and the duration of an attacked conversation.

STATEMENT REGARDING FEDERALLY SPONSORED RESEARCH OR DEVELOPMENT: Not Applicable.

REFERENCE TO SEQUENCE LISTING, A TABLE, OR A COMPUTER PROGRAM LISTING COMPACT DISK APPENDIX: Not Applicable.

BACKGROUND OF THE INVENTION

Security begins with privacy. Alas, ordinary privacy is under assault in cyber space, eavesdroppers, and data hunters peer into intimate communication and private conversations. While standard encryption hides contents of communication, it does reveal a lot about the communicators by tracking communication extent, frequency, volume, etc. It is time to develop tools to increase security in cyber space through better privacy tools.

Overview: This application builds on the continued application Ser. No. 16/687,690, "Effective Concealment of Communication Pattern (BitGrey, BitLoop)" presenting a cipher that can readily distinguish between ciphertext bits and non-ciphertexts bits, even if mixed together. This "decoy tolerance" attribute makes it a good cipher to deploy with the BitGrey and BitLoop protocols. The Replica is based on a bit operation where a feed bit string F is used to replicate a template bit string T, by copying from F bits according to the template T. If T is replicated when F was traversed exactly to its end, then T and F are said to be in a balanced template match. Such match will point F to T, so that if T is taken to represent a letter in an alphabet, then F will point to it. And since F can be constructed to be very much longer than T, it so happens that one builds a large as desired ciphertext to send a given size message. This allows one to transmit a fixed rate output string while hiding how much, if any, real communication took place. The Replica cipher is highly randomized, compelling its attacker to be limited to brute force attack, and moreover, it hides not only the contents of the communication but also its pattern. This is a big advantage over mainstay ciphers that reveal to their examiner the extent the frequency and the duration of an attacked conversation.

Figure 1:
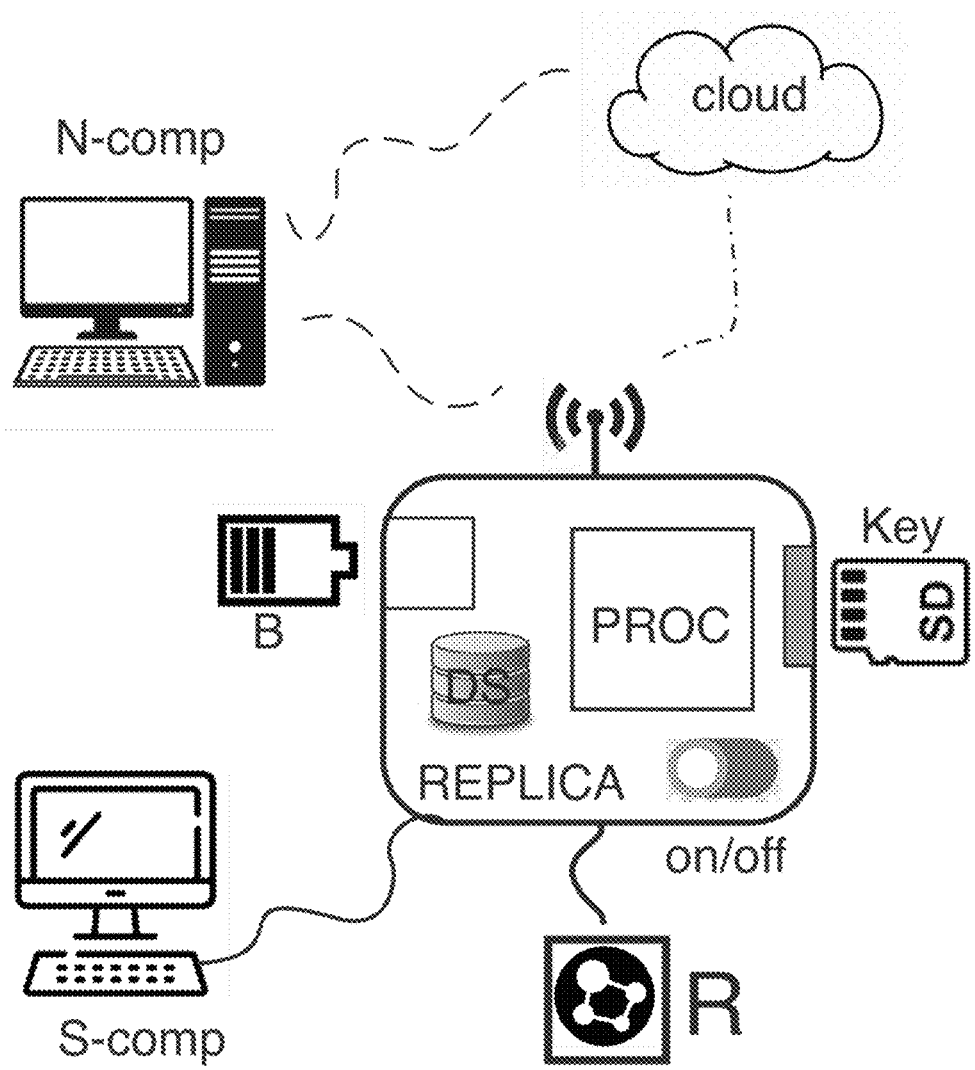
FIG. 1: REPLICA Box configuration

This figure shows the stand alone Replica box which is connected by wire to the secure computer (S-comp), and by wire or wireless to the networked computer (n-comp), and the box is shown to have optionally an independent communication element to directly send and receive messages through the Cloud. The Replica box is shown connected to an external randomness source. It shown to have a battery, an on/off switch and a port to fit in a large capacity SD device containing the Replica key. The drawing also shows a data storage element and a computing element.

Figure 2:
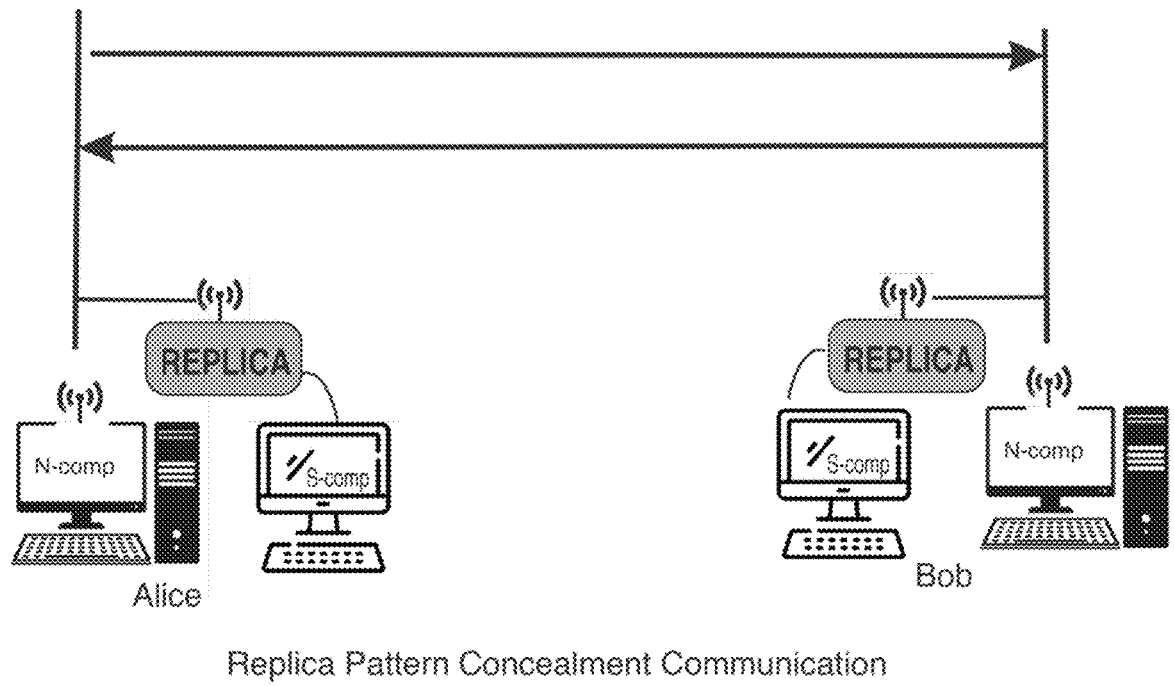

FIG. 2: Replica Pattern Concealment Configuration

This figure shows two communicating parties Alice and Bob, each having a Replica box connected each to an s-comp and an n-comp. Alice and Bob are sending each other a fixed rate of randomized bits. An outside observer will not know whether this stream is all randomized meaningless bits or some of them are bona fide messages between Alice and Bob.

Figure 3:
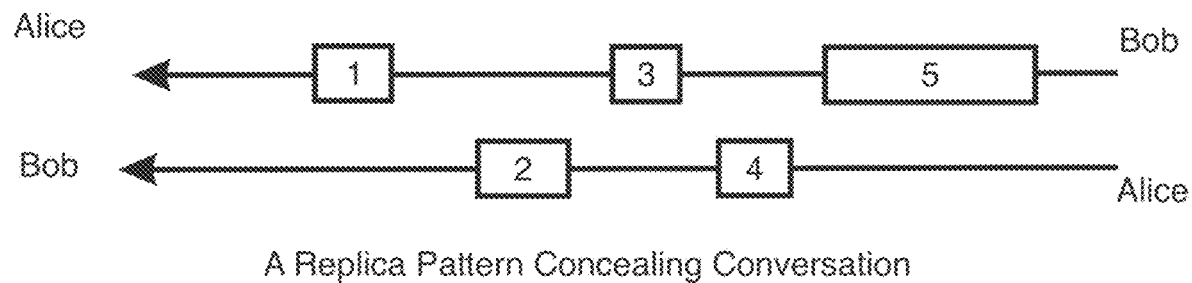

FIG. 3 A Replica Pattern Concealing Conversation

This figure shows Alice and Bob streaming a constant bit rate to each other and lacing these randomized bits with meaningful messages. At some point Bob sends Alice message 1, Alice after some time replies with message 2, Bob replies to it with message 3 and so on for messages 4 and 5. This conversation is totally hidden for the outside observer who sees only a fixed bit flow of randomized looking bits.

INTRODUCTION

We first describe the mathematical operation of the Replica cipher, then discuss its cryptographic applications.

Given an alphabet A comprising 1 letters $a_1, a_2, \ldots a_l$, a string Q is defined as a concatenation of q letters from A, where r may be finite, or $q \to \infty$.

Let T, "Template" be a string of letters from A comprising t letters. Let F, "Feed" be a string of letters from A comprising f letters.

Replication (Basic Mode—Bitwise)

We define a process called 'replication' (R, or Rep). The general idea is to use the template string T as a template to replicate itself by taking letters from the feed string F, to build a copy of T. The feed string F with f letters, supplies t letters to replicate T (which is comprising t letters), and the balance d=f-t is discarded. Replication may be an imbalanced match between T and F, a balanced match between T and F, or a perfect match between T and F. The precise definition of the Rep operation is as follows:

The replicator function, REP, is guided by the template T, and is removing bits from the feed string F. It starts with letter $t_1$, the first letter in T ($t_1 \in A$). The replicator function then scans F from the first letter $f_1$ and up through $f_2$, $f_3, \ldots f_i$ where $i=1,2, \ldots f$. If string F does not contain the letter $t_1$, the replicator returns 'failed'. This is regarded as "zero match" situation.

Alternatively the replicator encounters letter $f_1$ in F ($1 \leq i \leq f$), such that $f_i=t_1$. The replicator then removes letter $f_i$ from F and places it in the first cell in a register of size t letters. The replicator then reads letter $t_2$ ($t_2 \in A$), and searches for this letter $t_2$ from letter $f_{i+1}$ and up to letter $f_f$. If this search fails, then the replication stops, and a 'failed' status is issued. The register, containing only one letter $t_1$ is identified as a 'short template', the other f-1 letters from F form a discarded string D.

If this search is successful and the replicator finds letter $f_k$ in F (k>i) such that $f_k=t_2$, then $f_k$ is moved to the 2nd spot in the register where the replica of T is being built, and the replicator then reads the third letter in T, $t_3$.

The processes repeats: the replicator looks for a letter $t_3$ in the F string from letter $f_{k+1}$ to letter $f_f$. If the search fails then the string in the register, comprising 2 letters is submitted as output declared 'short replica' and the f-2 letters in F in order, form a string D of discarded bits. The replica operation is designated 'failed'.

This process repeats until one of the following two events occur:
1. The replication is complete, the register contains a copy of T
2. A search for a letter in T fails, as described above, before the replication is complete In the 2nd case the replication is considered 'failed'. In the 1st case, we further identify the following cases: (i) The replication is completed by passing the last letter in F, $f_f$ to the register in position t, namely $f_f=t_t$. This is called a balanced match.

If that condition is not fulfilled then it is an imbalanced match.

The discarded bits by their order in F comprise a discarded list, D. This list is also called the 'decoy list', and its bits are the decoy bits.

The letters assembling in the register to where some F letters are routes, defines a replicated template, T*. T* will have t* letters when F has been done processing through its f letters. If t=t* then the replication occurred (balanced or imbalanced). If t*<t then the replication has failed, because only part of the template has been reconstructed from the letters in F.

d letters of F are discarded (cancelled) in the duplication process: d=f-t*

We define a distance $\delta$ between T and F: $\delta=\delta(F,T)=f/t^*-1$

Note: the description above states that the last letter in the feed F will be the last letter in the template guided register for a balanced match. However, this can be modified to state that the last letter in the register will be the letter one, two, or more, before last in the Feed.

Analysis of the Replication Process

Clearly if T=F, then f=t=t* and the distance $\delta(F,T)=f/t^*-1=0$. where t* is the number of letters accumulated in the register before the replication failed, or succeeded.

If F has sufficient letters to replicate the template T, then T*=T. That is only if the letters in T appear in F in the same order (not a permutation thereto).

Illustration: let F='ABCD', and T='BDAC'. The first letter in T is B. The first letter in F is A, so A is discarded (starts the discarded list). The second letter in F is B so B goes to the register for the starting spot. The second letter in T is D, but the third letter in F is C which is discarded (the discarded list is now AC). The 4th letter if F is D, so this D goes to the register. That is it, no more letters in F, so the replication algorithm is done. Resulting in an incomplete register T*=BD, and a discarded string D=AC.

However, if F=BCCSDCCABBC then relative to the same template:

F=BCCSDCCABBC, B ~~CCS~~ D ~~CC~~ A
~~BB~~ C→BDAC=T and the distance d(F,T)=11/4−1=1.75

Lemma: If F^ is a random series of letters from A of an indefinite length, then for any T there will be a value f, such that the string comprised of the first f letters, in F^, namely string F will have a balanced match with T.

Proof: any letter $t_i$ in T will have a chance p=1/l>0 to be the next letter in F^, such that after sufficient instances of discarding letters in F^, the required letter $t_i$ will appear.

Lemma: The above lemma is correct even if F^ is not perfectly randomized, as long as the chance to appear in F^ for any letter $a_i$ of alphanet A is somewhat above zero.

If T is a random string in alphabet A, then one would compute the length f of a random series F that is most likely to build a balanced replication match with T. To the extent that a source of randomness builds a feed string F' where the size f' is much different from f, then either F' or T are not very random. This may serve as a basis for measuring randomness.

We examine the relationship $\delta=\delta(F,T)$. $\delta$ computes very easy and the answer is definite and unequivocated. However both reverse options are seriously equivocated.

Two Ways Many to One

We say Y=REP(X), (REP stands for the replica algorithm described above) if X as a feed and Y as a template establish a balanced match. The REP algorithm therefore is generating a balanced matching Y for a given X. We say X=REPR (Y) (REPR stands for reverse-Replica) if X as a feed and Y as a template establish a balanced match.

REPR is also denoted as "The Replica Builder", it builds a proper feed for a given template.

We have seen above that it is very easy and straight forward to build feeds from templates. In other words the Replica Builder can be applied again and again with different results each time. Since there is no limit to the number of decoy letters to be added to the template, there is also no limit to how many feeds can be matched with a given template. In other words Y→X is a one-to-many relationship.

We now show that this relationship of one-to-many also applies in the reverse. given a feed of sufficient size, an unlimited number of balanced matching templates can be devised.

We describe a Template Builder from a given feed. Let F be a feed string comprising z letters $f_1, f_2, \ldots f_z$ from the transmission alphabet T: $t_1, t_2, \ldots t_m$. Let $f_i \neq f_{i+1}$ for i=1,2, . . . (i−1). By removing $f_i$ from F (now comprising z-1 T letters), one generates a template P.

Proof: applying the replica algorithm REP to P as a template and F as a feed one finds in F all the letters in P from the first $p_1=f_1$, to $p_{i-1}=f_{i-1}$. However the next letter in F, $f_i$ does not fit the template expectation, so $f_i$ is discarded and the count moves to $f_{i+1}$ which is exactly what the template expects namely $f_{i+1}=p_i$. From there on $f_j=f_{j-1}$, i<j<f−1.

Illustration. Let the transmission alphabet T be comprised of four letters: $t_1$=X, $t_2$=Y, $t_3$=Z and $t_4$=W. Let a feed F be: F=XYYWZXY. Letter $f_3 \neq f_4$, therefore by removing from F letter $f_3$, one will generate a template P=XYWZXY which is easily verified. Similarly $f_6 \neq f_7$, and therefore by removing from F letter $f_6$ one generates a template P'=XYYWZY, which again can readily be verified.

One could combine the two procedures above and remove $f_3$ and $f_6$ to generate template P"=XYWZY, as can be readily verified.

As the illustration indicates this procedure of removing a single letter from the feed can be applied to any letter in F to create f templates. This f procedures can be applied to any of the f letters in every combination, creating a large number of possible templates generated to match a particular feed. The count is not infinite per a given feed because the template will have to be of same size or smaller than the feed string, but since the feed can be made as large as desired, the number of corresponding templates is also as large as desired.

We conclude then that the REP and REPR are one-to-many both ways, and therefore knowing one leaks negligibly towards the other. In particular a cryptanalyst catching the ciphertext string, a feed, will not know what is the corresponding template it is pointing to. And the same template will be pointed to each time by a different feed. This will be assured by using randomness to select a feed to point to a given template.

The key to the cryptanalytic hurdle is the random selection not only of the template (the key) but also of the feed (the ciphertext).

The Replica algorithm is of a "loop" category. Namely, to build a template, one needs to have the template.

In the "loop" case where $y=F_y(x)$, if $F_y$ is algebraic then x may point only to one or few y values which can be cryptanalyzed, for example:

$$y=2xy-y^2$$

It may be converted to 1=2x−y, or y=2x−1, and no other solution. Such mathematical shortcut is not available when $F_y$ is highly randomized. In that case the cryptanalyst is limited to brute force approach which becomes effective only if the same key is used more and more. In the limited case when a cryptanalyst knows that h feeds F1, F2, . . . $F_h$ all point to the same template P, then for h high enough the equivocation will shrink to only one template value P that would serve as a valid template for all h feed instances. If both the feed and the target are fully randomized then the effort to deduce P from the h feed instances may be credibly probability estimated.

Cryptographic Application of Template Processing

We begin with a basic application: (with revised notations).

Let P be the plaintext alphabet, namely the language used by the communicating parties. P has p letters. For various reasons one may wish to map P into a different alphabet regarded as the message alphabet, A, or M. There is no encryption bridge between P and A, the two have a clear mapping. For example P may be Base64, and A may be a four letters alphabet X, Y, Z, W. Every Base64 is mapped to a string of 4 A letters.

Let A be an alphabet comprising n letters $a_1, a_2, \ldots a_n$.

Let each letter $a_i$ for i=1,2, . . . n be associated with a bit string $b_i$ of length $|b_i|$. We refer to these strings the b-strings.

Referring to the example above by using a four letter alphabet X, Y, Z, W there is a need to write only four bit strings $b_1, \ldots b_4$ rather than 64 strings.

When a transmitter wishes to send a recipient the letter $a_i$, he regards the respective string $b_i$ as a template, and constructs a feed string ci such that when the Replica algorithm is applied to feed and template, then the result is a 'balanced match'. Namely Replica replicates $b_i$ from $c_i$ such that when the replica is fully built the last bit from $c_i$ is used to fill the last spot in the register of the reconstructed template.

The transmitter will check $c_i$ against all other strings $b_1, b_2, \ldots b_{i-1}, b_{i+1} \ldots b_n$ to make sure that with none of those strings the replica algorithm generates a balanced match. If $c_i$ generates a balanced match with any $b_j$ for i≠j, then the transmitter will either send over $b_i$ as a decoy, or will discard it and at any case the transmitter will build another feed string candidate $c^*_i$.

The term decoy here refers to a string that is designed to fool an attacker that it represents a valid letter, alas the intended recipient will identify it as useless, a type II decoy. (We regard the decoy letters in the feed string F which were discarded as type I decoy letters). The intended recipient will do the same Replica evaluation performed by the transmitter, and if there is a balanced match with more than one b-string for the A alphabet then the recipient will conclude it is a decoy and discard it. Similarly if the string has no balanced match with any letter in A, such string will be regarded as 'decoy' and discarded.

The transmitter will try randomly to build another and another feed string $c_i$, and then will check that ci against all other $b_j$ strings for j≠i, until the transmitter will find a $c_i$ that does not have a 'collision' so to speak, namely does not have a balanced match with any other $b_j$ for i≠j, and then the transmitter will send over that $c_i$, which will not generate confusion on the receiving end. The recipient will find that $c_i$ has a balanced match only with $b_i$ and thereby the recipient will know that the string $c_i$ sent by the transmitter was indicating the letter $a_i$ represented by string $b_i$.

This mechanism will allow the transmitter to mix real letters with decoy letters that either have a balanced match with more than one letters in A or have no match with any other letter in A. The more decoy strings are used in a mix with the proper strings, the more is the burden on the cryptanalyst.

Easy to Build

Replica is so effective because given a template $T\hat{}$ it is easy to build a feed string F to have balanced match with $T\hat{}$. To do so one starts with $F=T\hat{}$, then arbitrarily add an arbitrary number d of decoy letters (in our case here bits) into $T\hat{}$ such that after an arbitrary letter in $T\hat{}$, $t\hat{}_i$ one will add a decoy letter $d_i$ which all that is required of it is that $d_i \neq t\hat{}_{i+1}$. Another letter (or bit in this case) $d'_i$ can be placed following $d_i$ as long as $d'_i \neq t\hat{}_{i+1}$. Thereby one will add d decoy letters to $T\hat{}$ to create a feed F that will fit a perfect replica match with $T\hat{}$.

In our crypto nomenclature we say that it is easy to take a b-string, $b_i$ and construct a corresponding c-string: $c_i$ such that $Rep(c_i, b_i)$ will constitute a balanced match. On the other hand it is not very unlikely that a given ci will have a balanced match with another b-string $b_j$ for $i \neq j$. The longer the b strings the more unlikely is it that a collision will occur, namely a balanced match will be found with two or more b strings.

Randomization

The power of Replica is in its simplicity The idea is to randomize as many decisions as possible. The b strings in Replica need not be of same size. One can set them arbitrarily or to increase randomization one will set a low limit for a b string $b_l$ and a high limit for a b string, $b_h$. Then the parties would use a randomness source, RND, to pick a length for $b_i$ such that $|b_l| \leq |b_i| \leq b_h$ for $i=1,2, \ldots n$. This re-sizing of letters will be used every time a key is selected.

Once the length of the b strings is determined then a randomness source will fill them up with bits. As a result each new Replica key will be of a variable size $|K|$ where:

$n*b_l \leq |K| \leq n*b_h$

The key is the n b-strings corresponding to the message alphabet A. This is shared randomness, in possession of all the parties to these conversations.

The transmitter on his or her part has now the freedom to decide how much larger his c-strings will be over the corresponding b-strings. Or say how many decoy bits of the first type to insert into the starting c string which is the pointed-to b-string.

This decision of decoy bits count can be made randomly for each letter sent to the recipient. While this add-on of decoy bits can be arbitrarily set, it is better to use randomization here too. So the transmitter will set a lowest level for decoy bits count $d_l$ and a highest level for decoy bits count, $d_h$, and then use a randomization source to pick a decoy number $d_i$ to construct ciphertext string $c_i$ (pointing to $b_i$, which in turn points to letter $a_i$ in the message alphabet).

$d_l \leq d_i \leq d_h$

The size of $c_i$ will be $|c_i|=|b_i+d_i|$, for $i=1,2, \ldots n$. The attacker then will face a randomized c string to point to a randomized b string.

The transmitter at will, will generate decoy string (type II), $d'_1, d'_2, \ldots d'_q$. where the number of these strings and where to put them in the transmission stream will be made arbitrarily or again in a randomized fashion. The more decoy strings type II the greater the security and the greater the longevity of the key. Recall that Tyep II decoy strings are strings that look as proper c-strings, but they either don't evaluate to a balanced match with any b string, or evaluate to a balanced match with more than one b string.

The transmitter will generate an arbitrary size decoy string d', then evaluate it for having a balanced match with any of the n b-strings. If it has no balanced match with any b-string, it is a valid decoy because the recipient, in possession of the key would readily realize it is decoy. If d will evaluate to a balanced match with two or more of the b strings then, too, d' qualifies as a type II decoy because the recipient will also identify the two balance matches and conclude that this is a decoy to be discarded. If it so happens that d' evaluates to one balanced match with one b string and not with others then this d' string cannot be used as decoy because it would confuse the recipient who would interpret it as the letter it points to. By selecting the b strings size properly the chance for a balance match can be controlled, either way: namely either to many matches or to no matches.

After using randomness to decide how may type I decoy bits to add to the b-string to construct the corresponding c-string, the transmitter can arbitrarily or randomly choose the bits in the b-string after which to add any additional type I decoy bit.

Generally the transmitter will decide on more decoys and large c-strings if the transmission is of high value, or the key is close to its useful life.

Illustration

Let us use a 4 letters alphabet A: $a_1=X, a_2=Y, a_3=Z, a_4=W$.

Let us specify a low and high limit for the size of the b strings: $b_l=6, b_h=12$.

Using a randomness source we randomly choose the bit size of the 4 b strings between $b_l$ and $b_h$:

$|b_1|=7; |b_2|=10; |b_3|=8; |b_4|=6$

Using a randomness source we define the b strings at the randomly selected size:

$b_1=1001101$ $b_2=1110010100$ $b_3=00100011$
$b_4=000110$

These 4 b strings are the shared key. (the four templates)

Let the transmitter wish to send the recipient the letter $b_1=X$. The transmitter will specify the low and high limits of count of discarded bits: $d_l=4, d_h=8$.

The transmitter will start to build $c_1$ by copying the template, namely: $c_1=b_1=1001101$ The transmitter will use a randomness source and pick a number between $d_l$ and $d_h$, say $d_l=6$ and $d_h=8$, say pick 7.

The transmitter will now build $c_1$ such that $|c_1|-|b_1|=RND(d_l, d_h)=RND(6, 8)=7$ The transmitter will now randomly pick a bit in $b_1$, from the first bit, $b_{1,1}$ to the one before the last $b_{1,6}$, say, the third bit: $b_{1,3}=0$. The next bit in $b_1$, namely $b_{1,4}=1$. therefore the transmitter adds to the original $c_1$ string the bit 0 after bit 3:

$c_1=100[0]11101$

The transmitter uses again a randomness source to pick up another bit in $c_1$, it come out $b_{1,6}=0$. Since $b_{1,7}=1$, then the transmitter will set a different letter nanely 0: (added bits are enclosed in brackets).

$$c_1=100[0]110[0]1$$

In a similar way the transmitter will add 5 more bits to $c_1$, as follows:
bit 3: after $b_{1,1} \rightarrow c_1=1[1]00[0]110[0]1$
bit 4: after $b_{1,5} \rightarrow c_1=1[1]00[0]11[1]0[0]1$
bit 5: after $b_{1,1} \rightarrow c_1=1[11]00[0]11[1]0[0]1$
bit 6: after $b_{1,4} \rightarrow c_1=1[11]00[0]1[0]1[1]0[0]1$
bit 7: after $b_{1,6} \rightarrow c_1=1[11]00[0]1[0]1[1]0[00]1$ The final shape of $c_1$ is 1[11]00[0]1[0]1[1]0[00]1 (the numbers in square brackets are the add on numbers]. $c_1$ is thus transmitted as:

$$c_1 (\text{transmitted})=11100010110001$$

The size of $c_1$ is 14 bits long comprising the original 7 bits and the add-on 7 bits.

Before transmitting $c_1$ the transmitter will check it against $b_2$, $b_3$, $b_4$:

$b_2$ as a template will not have a balanced match with $c_1$ as feed, the last 2 bits in $c_1$ are not participating in the templating:

$$c_1 \rightarrow 11100\{0\}101\{1\}00\{\{01\}\}$$

Bits surrounded by curly brackets are discarded in the templating process, bits surrounded by double curly brackets are left extra in the feed after the template is fully constructed.

$b_3$ as a template will not have a balanced match with ci as feed, because the feed will not have enough bits to build the $b_3$ template. The last bit in $b_3$ will not be built from $c_1$ as feed.

$$c_1 \rightarrow \{111\}00\ \{0\}10\ \{11\}00\{0\}1 = b_3 \text{ without the last bit}$$

$b_4$ as a template will not have a balanced match with $c_1$ as feed because $c_1$ will be left with the three last bits not participating in the templating process.

$$c_1 \rightarrow \{111\}0001\{0\}1\{1\}0\{\{001\}\} = b_4 \| 001$$

The transmitter now confirmed that the randomized $c_1$ evaluates to a balanced match only with $b_1$. It does not evaluate to a balanced match with any of the other letters in the alphabet.

The transmitter therefore will send $c_1$ to the recipient. The recipient will evaluate $c_1$ against $b_1$:

$$c_1=1\{11\}00\{0\}1\{0\}1\{1\}0\{00\}1 = b_1$$

and finds a balanced match. The recipient then evaluates as above $c_1$ against $b_2$, $b_3$, $b_4$ and finds no balanced match with any of them, and thus concludes that the transmitter sent him letter $b_1$.

The transmitter will repeat the process for as many letters as desired. All the randomizations except the key determination are unilateral, namely the transmitter exercises them on his own without pre coordination with the recipient.

Two Alphabets Implementations

The base implementation above called for a message alphabet A comprising n letters $a_1, a_2, \ldots a_n$, each letter $a_i$ for i=1,2, ... n being represented by a bit string $b_i$. This base implementation can be amplified by using a transmission alphabet T comprising r letters: $t_1, t_2, \ldots t_r$, then associating every letter from the message alphabet with a string of letters from the transmission alphabet, for instance:

$$a_5 = t_7 - t_4 - \ldots t_r - t_9$$

If the transmission alphabet is set to binary, namely r=2 and $t_1=0$ and $t_2=1$ then the two alphabet implementation collapsed to the base implementation.

The two alphabets are not imposing on each other, they can be completely different.

Illustration: message alphabet A is Base64: $a_1, a_2, \ldots a_{64}$. Transmission alphabet T is comprised of four letters: $t_1=X$, $t_2=Y$, $t_3=Z$, $t_4=W$.

The b-strings are of randomized length from a minimum $b_l=2$ to a maximum $b_h=12$.

So one can set:

$$b_1=XYWYZ, b_2=ZYXXYW\ b_3=YYXX \ldots$$
$$b_{64}=WWWXZXYYY$$

To build $c_1$ the transmitter will randomly decide that $|c_1|-|b_1|=3$, and then randomly pick $b_{1,1}$ (the first letter in $b_1$) to add a decoy letter.

So initially $c_1=b_1=XYWYZ$, adding one decoy letter after $b_{11}$ will be a choice between X, Z, W (any letter except Y). In this illustration the choice is random so:

$$c_1=X[W]YWYZ$$

Chosing $b_{13}$ next, we have:

$$c_1=X[W]YW[X]YZ$$

Choosing the third letter to add decoy as $b_{11}$ again (random choice), allows one to once again add a decoy letter that is any letter except Y, it may be the same as before, namely W, or a different one:

$$c_1=X[WZ]YW[X]YZ=XWZYWXYZ$$

So constructed $c_1$ will evaluate to a balanced replica match with $b_1$, and if it checks out to avoid any balanced match with any of the other 63 letters in the A alphabet then this $c_1$ string will be sent to the recipient who will repeat the same evaluations (with his own copy of the key) and decipher $c_1$ to point to $b_1$, reflecting $a_1$.

The transmitter can choose for each letter (i) how many decoy letters to add to the b string to construct the respective c string, and (ii) which of the (r−1) letters in the transmission alphabet T to use for the purpose of inserted decoy letter.

These choices may be used for subliminal messaging.

Subliminal Messaging

The Replica cipher is inflationary so to speak, it projects security through lavish expansion of bit flow. The extra bits used to project security can also be used to deliver a secondary, so called subliminal message. All in all a singular flow of bits.

In the Replica cipher a subliminal message can be used via the added decoy bits on top of the template towards the Feed. We describe two ways of doing so. One by using the number of decoy letters added to each letter sent as representative of a given letter, the other applies to two-alphabet implementation where the transmission alphabet has more letters than two. In that case the letter identities of the decoy letters reflect the subliminal message.

In case of using the letter identity method, this dual mode encryption can be applied in a cascade mode, namely to apply the Replica to the transmission letters. This can be applied iteratively indefinitely.

Decoy Count Subliminal Messaging

The number of added decoy letters can be arbitrarily set regardless of the identity of the message letter that is being transmitted. One can therefore define a subliminal alphabet S comprised of $s_1, s_2, \ldots s_p$ letters, and assign the integers $1, 2, \ldots p$ one to each letter.

The transmitter will convey to the recipient the prime message M via the message alphabet A, and while so will convey to the recipient a subminimal message M' via the message alphabet S.

Illustration: Let the prime messsage $M=a_3-a_1a_7$, and let the subliminal message $M'=s_9-s_4-s_2$.

Let us set $s_i$ to be indicated by the integer i. Thus the transmitter will build a perfect match for $b_3$ (to send letter $a_3$), by adding 9 decoy letters so that the transmitter will generate $c_3$, such that $|c_2|-|b_3|=9$. The transmitter will add 4 decoy letters when building the letter $c_1$ to represent $a_1$, and will create $c_7$ such that $|c_7|-|b_7|=2$.

The recipient will interpret the three letters send to him $c_3$, $c_1$, $c_7$, as primary message $M=a_3-a_1-a_7$ written in the message alphabet A, and will interpret the same input as indicating the subliminal message $M'=s_9-s_4-s_2$.

While the primary message and the subliminal message may be unrelated, they may also be related in some underlying way, say the subliminal message is an indication of the credibility of the primary message.

Three Alphabet Subliminal Messaging

We have identified three alphabets:
1. The Message alphabet, A: $a_1, a_2, \ldots a_n$
2. The Transmissikon alphabet T: $t_1, t_2, \ldots t_r$
3. The Subliminal alphabet S: $s_1, s_2, \ldots s_p$ The Subliminal message is comprised of add-on decoy letters with one caveat, the add on letters cannot include the letter that appears next in the template.

Illustration, let the template (a b-string) be: XYYZX. The randomization process points to the letter in the b-string to build some decoy letters on:

XYYZX→XYY-[decoy string]-ZX

The decoy string cannot include the letter Z otherwise it would be mistaken to a template Z. This limitation limits the free use of the subliminal alphabet for any unrelated message. This limitation can be solved in several ways, one is described right here:

Each of the subliminal letters in the subliminal alphabet S will have several alternate expressions written in the transmission alphabet. Each of these alternatives will have one transmission letter that is not being used. Thereby the writer would be able to construct a decoy list from transmission letters such that the decoy will not have a transmission letter that is the same as the next letter in the template.

For example, let the transmission alphabet be comprised of four letters T: $t_1=X, t_2=Y, t_3=Z, t_4=W$.

One can set the letters of the subliminal alphabet as follows: S comprised of four letters: $S_1=A, s_2=B, s_3=C, s_4=D$, where each of these four letters will have four different combinations of transmission letters to choose from:
A—XY XZ XW YY
B—YX YZ YW XX
C—ZX ZT ZW WW
D—WX WY WZ ZZ So if the subliminal message needs to send the letter A, the transmitter can choose one of the four options above XY, XZ, XW, YY. If the decoy cannot include the letter X then A will be indicated by letter YY. If the decoy cannot include the letter Y then one of the two options XZ, and XW will indicate the letter A. If the decoy string cannot include the letter Z, then one of three options will do: XY, XW, YY. If the decoy cannot include the letter W then one of the three options will do: XY, XZ, YY.

So if the b-string is XYZXXWX, and the randomized process points to the second letter (Y) in the b string, then the decoy string cannot include the letter Z, so that it would be recognized as a decoy.

If the transmitter wishes to use the decoy at letter Y to send the subliminal message: M'=BAAD, then he will choose to represent B as YX, YU, XX, say choosing XX.

To represent the letter A, the options will be XY XW YY, say XY was chosen. The next letter in the subliminal message is also A, it can be represented the same way or in an alternative way: W, As for letter D, the options are: WX WY lets choose WY. the decoy string to represent the subliminal message BAAD will be:

BAAD→XX XY XW WY

The decoy string for BAAD does not include Z, and hence we have $c_i$=XYY-[decoy string]-ZX=XYY-[XX XY XW WY]-ZX When the recipient will template process $c_i$ with the corresponding template $b_i$=XYYZX, the recipient will remove the entire decoy list (between the square brackets) because it as a string without Z, and the template tell him to expect a Z.

The recipient will then analyze the decoy list based on the table above and will read the subliminal message as follows:

XX XY XW WY→BAAD

And this regardless of what the primary message said.

User Empowerment

Replica is a user-empowering cipher: the users are given power to impact the projected security. In a normal mainstay cipher today the security is fixed by the algorithm. The user has no means to affect the projected security. In some cases, like in AES, the users have a few different size keys to choose from, which is some limited empowerment. Replica, by contrast, allows its users to select any size key they wish, the larger the key the greater their security and unlike with RSA, increasing key size does not have any meaningful impact on the processing burden, so the selected key may be very large indeed.

Moreover the Replica transmitter can increase the projected security of each transmission by increasing the size of the decoy strings, mixing the true message with more and more digital information that increases the burden on the cryptanalyst without imposing any disturbing burden on the intended recipient of the transmission.

And lastly decoy string of Type II will further increase the projected security because the attacker will have to treat all the type II decoy strings as bone fide ciphertext.

Applications

We recognize:
1. nominal cyber security
2. Composite cipher applications
3. Pattern Hiding Applications We distinguish between the Replica implementor and the Replica user. The former will specify the following:

Alphabets:

1. The message alphabet
2. The transmission alphabet
3. The subliminal alphabet (if applicable)
4. b-strings sizes (key strings sizes) for the message alphabet
5. decoy string range
. The users will agree on:
6. the shared key (the b strings for the message alphabet letters)
And the transmitter will unilaterally decide on:
7. Decoy strategy More specifications will be required for the subliminal messaging.

We also recognize a third class of users: the maintainer. Replica is designed to limit cryptanalysis to brute force class attacks, and as such the user can credibly estimate how much use can be extracted from a given key before the adversaries' computing power will make progress towards revealing the key. Before such critical use level, there is a need to replace, refresh the key. Such refreshment can be taken care of by a dedicated maintenance party, so that the end user, the one sending messages back and forth, simply sends and receives messages without being bothered by the acts of encrypting and decrypting.

Nominal Cyber Security Applications

The Replica can be used any place where a symmetric cipher is called for.

The Replica protocol will first be specified by the implementor who will also set up any hardware, if applicable. The implementor will train the user. The user will have a safe portal to enter data and to read data. The only other control handle is for the transmitter to use it to indicate the programmed cipher how much extra security to project for a particular message, as reflected by the size of the decoy list. The maintainer will switch and refresh the key often enough to eliminate the risk of brute force cryptanalysis.

Software Contained Replica Application

Replica can be programmed as a package containing the operational logic, the randomness source (algorithmic) and the cryptographic key.

The Replica software may come with an input element to input data for the plaintext to undergo encryption and with an output element to send to the decrypted messages. The software will also have an input portal for the ciphertext to be decrypted, and a portal to release the ciphertext to the communication network to be transported to the intended recipient. These portals may be dedicated to the Replica or they may be part of a larger system, say an editor or a word processor, of which Replica is part.

The implementor here will pick the message alphabet, the transmission alphabet, and the key size.

For example, the implementor will pick Base64 as the message alphabet, namely 64 letters. A: $a_1, a_2, \ldots a_{64}$.

Say the implementor decided on a binary alphabet for the transmission alphabet. The implementor then will select a range for the size of the respective key strings (the b-strings): $b_1, b_2, \ldots b_{64}$.

Say the range will be $b_l=500$ bits for the low limit, and the high value $b_h=1500$. The exact length of the b string for each letter will be randomized, so the average length of key strings will be 1000 bits Hence the size of the key will be 64*1000=64,000 bits.

Note: the implementor may choose not to select b-string size randomly but rather select larger strings for more common letters and smaller strings for more rare letters.

The implementor will then specify the size range for the decoy string, say from a minimum $d_{min}=250$ to $d_{max}=1500$.

That means that the shortest c-string to be sent for a message letter will be 500+250=750 bits and the longest c-string to be sent for a message letter will be 1500+1500=3000 bits, with an average size of 1875 bits per c-string per a message letter. Comparing it to a normal Base64, which is 6 bits per letter, the Replica ciphertext in this case is 1875/6=312.5 This high size multiplier reflects the very high security of the transmission. Most super secret messages are short text and the 300× factor is no big problem. Of course the string sizes and the decoy string sizes could have been shorter, less cumbersome to use, but less security.

The work organization may be such that the implementor will also invoke a randomness source to generate the key and insure its distribution among the parties to the secret conversation.

Software Plus Attachment Application

There are two elements of the Replica cipher that are candidates for external attachment: (i) the key, (ii) the randomness source.

The key can be attached via any memory device to the Replica processing computing device, and so for the unilateral randomness source.

Replica Stand Alone Box Application

In this mode a Replica "box" will locally connect to a non-networked computing device for input data and for reading out data. The box may directly connect to the cloud, and dispatch transmission to an intended recipient, as well as receive transmissions from the cloud for processing in the box and passing the read out to the local computer. Alternatively, the box will connect to a networked computer that will take care of the transmission back and forth.

The Replica box will connect to the networked computer and the non-networked computer either via a cable or through a wireless mode like NFC or Bluetooth.

Box Operation

The box is connected to the non-networked computer, called the secret computer, where the secrets are in the open. The user types, dictates, paints, and copies any digital data into this secret computer. It has no network connection. The secret computer (s-computer) has an app which allows it to communicate with the box, through standard protocols. Passing plaintext to the box and receiving plaintext from the box. Thereby the user of the s-computer is oblivious to the fact that encryption is taking place.

The plaintext submitted to the box along with a security indicator SI, which is a number from 1 to 100, where lower number mean lower security (shorter transmissions) and higher numbers imply greater security and larger transmissions. The higher that number the larger the decoy lists used by the Replica box. The plaintext and the SI are used by the Box to create the ciphertext.

If there is no networked computer then the ciphertext is routed directly to the Internet and aimed at the intended recipient. If there is a networked computer (n-computer) then the box routes the ciphertext to it for the n-computer to handle.

The n-computer incorporates the ciphertext routed to it from the box in a broader protocol where it manages the transmission of the ciphertext to its intended reader. The n-computer will also receive encrypted transmission from a sender, handle it and route it to the box for encryption. The box will decrypt the incoming transmission and route the corresponding plaintext to the s-computer.

The Replica Box

The Replica has the following parts:
1. a computer processor
2. a key bay
3. operational digital storage
4. source of randomness
5. s-computer communication ports
6. battery
7. On-Off switch
8. On-Off indicator
and optionally:
9. n-computer communication ports
10. key data erasure button
11. A security envelope.

Basic Box Parts

They are:
1. a computer processor
2. digital storage
3. source of randomness
4. s-computer communication ports
5. battery
6. On-Off switch
7. On-Off indicator The computer processor will process the Replica protocol. It will access data and write data to the available digital storage.

The computer will use a source of randomness to build the decoy list, and optionally to build keys.

The Replica box will communicate with the s-computer through a wire preferably because of security concerns, but optionally through a locally restricted wireless communication.

The box works on a battery that fits in a slot and can be replaced as needed, alternatively the battery will be rechargeable.

The box will be equipped with an on/off switch with built in indicator as to the on/off status.

Optional Box Parts

The optional parts are:
9. n-computer communication ports
10. key data erasure button
11. A security envelope.

The box may communicate directly to the cloud with no need for a networked computer, but it will be more convenient to connect the box to a networked computer. The connection can be wire or wireless, no secret exposed information flows there.

The box may be fit with a quick key erasure bottom to protect security of past communication in case of a a threat.

The box may be placed in a secure enclosure that will detect any attempt to tamper with the box, and will instantly erase all sensitive data (the key).

Composite Cipher Applications

The idea here is to create a ciphertext stream which is a composite of some n plaintexts, $P_1, P_2, \ldots P_n$ such that by decrypting this composite ciphertext CC with a key $K_i$ for $i=1,2,\ldots n$ it will yield plaintext $P_i$.

A composite cipher must be able to be processed by a key $K_i$ holder such that all parts of CC that are not the ciphertext of plaintext $P_i$ will be readily identified as unrelated, and ignored. In other words, the CC will look to each of the n key holders as being comprised of ciphertext to be decrypted to $P_i$ and some other unrelated bits which are readily being ignored.

The Replica cipher immediately distinguishes between bits aimed for it, and unrelated bits so that the Replica cipher can readily be used for CC applications.

There are two classes we discuss here for composite cipher applications: (i) decryption differentiation, (ii) ultimate security

Decryption Differentiation

Here we have two sub categories: independent plaintexts, and dependent plaintexts. In the former the composite ciphertext, CC, is simply an aggregate of n individual ciphertexts $c_1, c_2, \ldots c_n$ where each $c_i$ for $i=1,2,\ldots n$ is decrypted by a respective key, $k_i$ to its own plaintext $p_i$.

The Replica cipher is decoy-tolerant, that means that its expected ciphertext ci may be mixed with (n−1) other ciphertexts so that everything except ci will be ignored by the Replica processor. In practice this allow a transmitter to prepare a single composite ciphertext CC, pass it to one of its n intended readers, which will pass the whole CC to another member of a cyber community, which in turn will find another member that has not seen this CC, and pass to him.

Each reader i, will extract from the CC ci and decrypt it with $k_i$ in its possession to the respective $p_i$.

The peer-to-peer transfer of CC is slower then broadcasting CC to all the readers, but it is more resilient to network disruptions.

The n plaintexts may be related in many ways, for example:
1. questions and answers
2. commentary
3. confidentiality grading For n=2, $p_1$ may be a set of questions, and p2 may be the set of answers. Students may be given $k_1$ to try to answer on their own, and the teacher or sometimes later they get $k_2$ to see the answers.

Commentary in $p_2$ could be related to $p_1$, explaining further, saying something related, or commenting on the authenticity of the statement in $p_1$.

$p_1$ may be the basic details of a given project, while $p_2$ reveals more technical details of higher security grade, while $p_3$ contains more sensitive data. In that case the common people on the project will be given $k_1$, the more sophisticated will be given $k_1$ and $k_2$, and the top executive echelon will be given $k_1$, $k_2$, and $k_3$. Thereby access credentials will determine how much each member of the project will see in the same CC.

Ultimate Security

In a given practical situation an adversary will make a comprehensive list of possible plaintexts that could have been encrypted into a capture ciphertext: $p_1, p_2, \ldots \ldots p_n$. The transmitter sends $p_i$ to its intended recipient who is in possession of The intended reader discards everything in CC except $c_i$, decrypts it and gets the $p_i$ message. The attacker, even an infinitely strong attacker, or especially a very strong attacker, will extract from CC all the n ciphertexts and somehow manage to decrypt them to the n plaintexts (or even more). This will leave the attacker with the same entropic situation as before having cracked CC. Both before and after the attacker has a list of n plaintext candidates without being able to distinguish between them any further. The CC does not tell the attacker which of the n kyes is used by the intended reader.

Pattern Hiding Applications

The sender will maintain a constant flow, F, of randomized bits to the sender, a fixed rate of bits/seconds. Since nothing is being transmitted, all these bits will be meaningless, randomized. Should the sender have a message p to be sent to the recipient, the sender will then encrypt p with the shared key k to generate c, of size |c| bits, and will replace |c| randomized bits with the random looking |c| bits in the flow F. The recipient will distinguish c in F (ignore all other bits) and use the shared key k to decrypt c to p and receive the message. Since c in Replica is thoroughly randomized, c will blend very well within F and leak no indication that the F has contained a message. Numerous messages can be sent that way limited only by the rate of bits/sec used for F.

The two parties may each take the role of a sender and so a conversation will take place via two counter flowing bit flows $F_1$ and $F_2$, which don't have to be of same bit rate. If the two counter flows are constant then the setup is not leaking any information as to the extent the frequency, the pattern of communication between the participating parties, not even a conversation took place at all.

This non-leakage set up can become even trickier if instead of constant flow rate, the bits/sec of F change in some way, Perhaps, the more the parties talk, the lower the F used, to give the misleading impression of no conversation when the conversation is most extensive and vice versa, to give the impression of extensive conversation (high flow rate) when nothing is communicated between the parties.

Packaging the Transmission

The transmitter wishes to send a plaintext message P to the recipient. The message is comprised of p plaintext letters. These plaintext letters are mapped to message letters in the A (or say M) alphabet. Their count is m M letters. Each of these m letters is indicated to the recipient by a ciphertext string c: $c_1, c_2, \ldots c_m$.

These m strings are of variable size, so if sent one after the other the recipient will not know how to parcel the coming stream to individual c strings. There are several ways to resolve this issue:
1. length indicator header
2. Bit doubling In both cases it would be helpful to further obscure the ciphertext by complete transposition as indicated in "Pattern Devoid Cryptography" published on IACR eprint archive.

Length Indicator Header

Let $1=b_{max}+d_h$, where $b_{max}$ is the largest b-string in the alphabet and $d_h$ be the largest number of decoy bits to add to b to construct c. l then will be the largest bit count of any c string in the transmission. Let q the smallest integer for which:

$$2^q \geq b_{max}+d_h$$

Thus a string of q bits will be sufficient to indicate the size of any c string. The transmitter thus will be able to precede each c string with a header of size q bits and populate this q bits such that in binary langue it will incidate the bit size of the c-string right following it. The transmitter will attach that c-string to the header. Following that string another pair of header and string will be placed and so on until the entire m letters of the transmitted message are passed ahead. This way the recipient will read in each header how long the coming c string is and where the next header starts.

Bit Doubling

By mapping bits to double-bit one will have two signals to indicate where a string starts in a steam and where it ends. So mapping 0 to '01 and mapping 1 to '10' will leave '00' and '11' to be used to terminate strings. Such stream will also be very strong if transosed because the number of ones and the number of zeros is very close.

Abstraction

We consider a function $f_y$, which depends on a value y, and where:

$$y=f_y(x)$$

Given x, y cannot be readily computed because the computing function $f_y$ depends on the value of y, which is what comes as a result from computing $f_y(x)$. Yet, given y it is easy to verify that $y=f_y(x)$ because y will determine $y \to f_y$.

This fact can be used in cryptographic protocols where prover will prove to a verifier that the prover knows the value y, by submitting x such that $y=f_y(x)$.

We further limit $f_y$ to be a many-to-one algorithm, namely that there very many values for x that would result in the same value of y. In that case when this or another prover wishes to once again to prove to the verifier that they are in possession of y, they communicate another value x. A hash function is an example for such a many-to-one algorithm.

Another cryptographic use is encryption. Let a message alphabet A be comprised of n letters $a_1, a_2, \ldots a_n$, and let each letter be associated with a value $b_1, b_2, \ldots, b_n$. A transmitter and a recipient share A and the n b-values. The transmitter may send the recipient letter $a_i$ as part of a message going from the transmitter to the recipient, by sending a value $c_i=x$ that would compute to $b_i=y$ via a function $f_y$ such that: $y=f_y(x)$.

The recipient will apply the value of $c_i=x$ to all the b values representing the alphabet A, and if only $y=b_i=f_y(x=c_i)$, then the recipient will conclude that the transmitter opted to send him letter i. Any adversary not aware of $b_i$ will not be able to extract $y=b_i$.

In general given an arbitrary x value, one could pick an arbitrary z value and device $f_z$ such that $z=f_z(x)$. Therefore knowledge of x does not give any indication as to the value of y. In other words x does not point to y.

Such loop-function offers resistance against known plaintext attack. Knowing that an input x points to a letter $a_i$ does not reveal which is the $b_i$ associated with $a_i$. And since y can be pointed to by very many x values, it is possible to enter into the protocol a requirement for no double use of an x value to point to a y value.

We list several embodiments of these loop-functions:
1. Integer key permutation.
2. BitFlip
3. Replica Integer key permutation is permutation of a list x to a list x' determined by a key which is in the form of an integer, k.

$$x'=T(x, k)$$

Let x, and x' be bit strings permutations, and the k=x or k=f(x) then given x it is easy to compute x', but given x' it is difficult to compute x because the reverse transposition depends on k, which in turn depends on the x transposition which is not known before the transposition is carried out, but it cannot be carried out because k is not known . . .

BitFlip: it is easy to verify that two bit strings x and x' have a required Hamming distance, d, between them, but given x, there are many y strings with a Hamming distance of d from x, it is unclear which of them is x'.

Replica: The feed string F ends us with a result string T but the process of F→T depends on the result T.

Operational Definition of the Invention

1. This invention describes a methodology to construct a decoy tolerant cipher where a transmission from transmitter to recipient is comprising ciphertext bits which are mixed with other bits (decoy bits) so that the recipient readily distinguishes between the ciphertext bits and the decoy bits, and the recipient decrypts the ciphertext bits and discards the decoy bits while an attacker does not know what parts of the transmission, if any, is a message passed from transmitter to recipient, as opposed to transmission of random bits, and thus the attacker is blind towards the pattern of communication between the transmitter and the recipient, and blind towards the content of the communication, if any, comprising:

1.1. a message alphabet, A comprising n letters $a_1, a_2, \ldots a_n$ 1.2. a transmission alphabet, T, comprising m letters $t_1, t_2, \ldots t_m$ 1.3. a set of b-strings, $b_1, b_2, \ldots b_n$ comprising letters of alphabet T, where each string $b_i$ is associated with its corresponding letter a, for i=1,2, . . . n 1.4. an algorithm called Replica that generates a replica of a b-string serving as a Template, from a c string comprising T letters, designated as the 'Feed', by pointing to the letters in the c string by order, and moving some of these letters one by one to a register such that the register holds a replica of the Template, and such that when the last letter of the replica is added to the register, the pointer over the c string reached the end of the c string;

1.5. an algorithm called a Replica Builder that builds a string c (a Feed) that generates a replica of a given b-string (a Template) comprising q letters from alphabet T according to (1.4) above where the Replica Builder operates as follows:

one constructs a Replica output c string by first setting c=b, this is the initial setting of the c string which will evolve to its final form to become the Feed, then one adds an arbitrary number g of T letters to the c string, one by one, where each of those letters is being added as follows:

the evolving c-string includes q letters of T: $r_1, r_2, \ldots r_q$, where $r_i$ is a letter of the transmission alphabet T for i=1,2, . . . q, in its initial setting, one picks an arbitrary letter $r_i$ for i=1,2, . . . (q−1), from the initial setting, and injects between it and the next letter $r_{i+1}$, an arbitrary letter from T, $t_j$ where $t_j \neq r_{i+1}$;

the resultant string, c, is comprising (q+g) letters and when inputted to the Replica algorithm as a Feed, with the b-string as the Template, then it generates the Template replica in the Replica register, namely, letters from the feed were moved to the register to generate an exact copy of the Template, and when this was done, the pointer over the Feed string reached the final letter in the Feed.

The set of n b strings $b_1, b_2, \ldots b_n$ is considered the encryption/decryption key and is shared by the transmitter and the recipient along with the message alphabet A and the transmission alphabet T.

To send a letter $a_i$ for i=1,2 . . . n to the recipient, the transmitter will (i) use the Replica Builder algorithm to build a c-string $c_i$ as a Feed that would generate a replica of $b_i$ when processed through the Replica algorithm, ( ii) check that when $c_i$ is Replica processed with $b_j$ for j=1,2, . . . (i−),(i+1), . . . n the result is not a replica of $b_j$ (iii) if $c_i$ when Replica processed with $b_j$ yields a replica of $b_j$ then the transmitter denotes this string as decoy string, and repeats step (i) building another c-string. The transsmitter will decide weather to discard this $c_i$ or to send it out as decoy.

(iv) if $c_i$ when Replica processed with $b_j$ does not yield a replica of $b_j$ for all j=1,2, . . . (i−), (i+1), . . . n then the transmitter transmits $c_j$ to the recipient, to communicate to them the letter $a_i$.

The Recipient processes the transmitted $c_i$ against all $b_i$ as Template; if the transmitted $c_i$ generates one and only one replica among all the b strings as Template then the recipient concludes that the A letter associated with this b string is the plaintext letter corresponding to $c_i$;

if the $c_i$ string generates no replica with any b string then $c_i$ is considered a decoy string and is being discarded by the recipient;

if the $c_i$ strings generates replica with respect to two or more b strings then the $c_i$ string is considered decoy and discarded; thereby the Replica cipher is decoy tolerant.

2. The method in paragraph 1 wherein the transmitter generates c-strings that do not generate a replica with any b string, or generate a replica with more than one b string, and transmits these c strings as decoy to the recipient who identifies them as decoy and ignores them;

and where such transmission of decoy strings can be done at a selected fixed rate and when the transmitter wishes to send a message to the recipient, they replace one or more decoy strings with c strings that point to a particular, letter, v, of the A alphabet.

And where the transmitter will transmit to the recipient an arbitrary message written in the A alphabet and transmitting that message letter by letter as described above by transmitting the corresponding c strings (Feeds), and mixing them with an arbitrary number of decoy strings.

3. The method in paragraph 2 where both parties maintain a fixed flow rate of a stream of digital strings to the other, and each injects into their streams the messages they wish to communicate to the other, thereby the parties run a conversation without projecting its pattern;

this injection is in the form of replacing a decoy string with a b-string that points to a letter of the message alphabet A, and its replacement is carried out without affecting the constant bit flow rate from the transmitter to the recipient so that an outside observer receives no indication that a decoy string was replaced by a letter communicating string (a ciphertext string).

4. The method of paragraph 1 where parameters are determined by a source of randomness, in particular source of randomness will determine:

4.1 the size of each of the n b strings associated with the n letters of the A alphabet, where the size is given by the number of letters from the transmission alphabet T that comprise the b strings. The transmitter will specify a low limit $b_l$ and a high limit $b_h$, and let randomness choose a value in between.

4.2 the letter content of each of the n b strings associated with the n letters of the A alphabet, in terms of the identity of the comprising T letters and their order;

these parameters are randomly determined and shared by the parties. They are regarded as the shared cryptographic key.

The following parameters are determined unilaterally by the transmitter using a source of randomness:

4.3 the number of g added letters used by the Replica Builder each time a c-string is built to communicate to the recipient a given letter from a message;

4.4 the identity of the g added letters used by the Replica Builder each time a c-string is built to communicate to the recipient a given letter from a message.

5. The method of paragraph 1 where the transmitter is selecting the successive values of the g added letters in the Replica Builder to communicate a secondary (subliminal) message to the recipient. A specially defined subliminal alphabet S comprising g letters $s_1, s_2, \ldots s_g$, will be associated each to an integer in the range 1-g: $s_i$–i. To communicate letter $s_i$ subliminally with communicating letter $a_j$ from the message alphabet A, the transmitter will point to b-string $b_j$ which is associated with $a_i$, and do so by using the Replica Builder algorithm with $b_j$ as the template, and building a cipherstring $c_j$, with i added decoy letters so that $|c_j|=|b_j|+i$. The recipient will interpret $c_i$ as pointing to letter $a_i$ in the A alphabet and pointing to letter $s_j$ in the subliminal alphabet S.

6. The method of paragraph 1 where the transmitter is selecting the identities of the letters added in the Replica Builder algorithm for the purpose of communicating to the recipient a secondary (subliminal) message.

7. The method of paragraph 1 where the transmitter will increase the cryptanalytic burden projected by the transmission by increasing the number of decoy strings mixed with the c strings that point to letters of the transmitted message.

8. The method of paragraph 1 where k alphabets $A_1, A_2, \ldots A_k$ are being used, and each alphabet i for i=1, 2,...k has $n_i$ letters, and all $L=\Sigma n_i$ letters are each associated with a unique b-string comprised of a shared transmission alphabet T, and where k parties are each in possession of the b-strings of one or more alphabet and no other b-strings;

the transmitter would send letter j of alphabet I, $a_{ij}$ to the party in possession of the b-strings (the key) for alphabet i which the other parties would interpret as decoy and discard, thereby enabling a parallel ciphertext where messages to k recipients are mixed together and each recipient sees only the message aimed for them, regarding the rest as decoy.

9. This invention describes a system performing Replica encryption and decryption in a stand alone box communicating with a secure computing device (s-comp) and with a networked computing device (n-comp) as well as with an external source of randomness (RND); the box contains the Replica cryptographic key, a computing component, a data storage element, and an operating battery;

the system is accepting plaintext from the s-comp, it encrypt it with the Replica operation described in claim 1, using randomness from the randomness source; the digital output including mixing c-strings with decoy strings, then communicating the resultant digital message either directly to the remote recipient via the cloud, or via the local n-comp;

and where the box accepts encrypted messages mixed with decoy strings either directly through the cloud or via the n-comp, then the box decrypts the incoming messages and communicates the extracted plaintext to the s-comp for the recipient to read.

10. The method in claim 9 where the transmitter indicates to the box the amount of decoy strings to be used for mixing with the c-strings that point to a letter in the communicated message.

What is claimed is:

1. A method of constructing a decoy tolerant cipher, the Replica cipher, where a communication of an encoded transmission of a message M from a transmitter to a recipient comprises ciphertext bits which are mixed with additional decoy bits in a manner so the recipient can readily distinguish between the received ciphertext bits and the received decoy bits, with the recipient decrypting the received ciphertext bits and discarding the received decoy bits, but while an interception by an attacker of the communication cannot determine what portions of the encoded transmission, if any, is the message passed from the transmitter to the recipient, the encoded transmission appearing to the attacker as a transmission of random bits, resulting in the attacker being blind regarding the pattern of communication between the transmitter and the recipient, and blind regarding the content of the communication, if any, the method comprising:

by a computing device:

a) a message alphabet, A, comprising n letters $a_1, a_2, \ldots a_n$; the transmitted message M comprising a string of s letters from A;

b) a transmission alphabet, T, comprising m letters $t_1, t_2, \ldots t_m$;

c) a set of b-strings, $b_1, b_2, \ldots b_n$ comprising letters of T, where each string $b_i$ is associated with a corresponding letter $a_i$ for i=1,2, ... n;

d) an algorithm named Replica that generates a replica of a b-string serving as a Template, from a c-string of T letters, designated as the 'Feed', by a pointer pointing to the letters in the c-string by order, and moving some of the c-string letters one by one to a register such that the register holds a replica of the Template, and such that when the last letter of the replica is added to the register, the pointer to the c-string letters reaches the end of the c-string;

e) an algorithm named Replica Builder that builds a c-string (a Feed) that generates a replica of a given b-string (a Template), the b-string comprising q letters from alphabet T according to the Replica algorithm;

where the Replica Builder algorithm further comprises:

constructing a Replica output c-string by first setting c-string=b-string, which is the initial setting of the c-string that evolves to its final form to become the Feed;

adding an arbitrary number g of T letters to the c-string, one by one, where each of these letters is added by:

the evolving c-string including q letters of T $r_1, r_2, \ldots r_q$, where $r_i$ is a letter of the transmission alphabet T for i=1,2, ... q, in its initial T-setting, and choosing an arbitrary letter $r_i$ for i=1,2, . . . (q−1), from the initial T-setting, and injecting between $r_i$ and the next letter $r_{i+1}$, an arbitrary letter from T, $t_j$ where $t_j \neq r_{i+1}$;

resulting in the string c, comprising (q+g) letters that when input to the Replica algorithm as a Feed, with the b-string as the Template, generating the Template replica in the Replica register;

the set of n b-strings $b_1, b_2, \ldots b_n$ are regarded as the encryption/decryption key of the Replica cipher that is shared by the transmitter and the recipient along with the message alphabet A and the transmission alphabet T;

in sending a letter $a_i$ for i=1,2 . . . n to the recipient, the transmitter:

(i) uses the Replica Builder algorithm to build a c-string $c_i$ as a Feed that will generate a replica of $b_i$ when processed through the Replica algorithm, (ii) checks that when $c_i$ is processed by the Replica algorithm with $b_j$ for j=1,2, . . . (i−1),(i+1), . . . n, that the result is not a replica of $b_j$, (iii) if $c_i$ when processed by the Replica algorithm with $b_j$ yields a replica of $b_j$ then the transmitter denotes this string as a decoy string, and repeats step (i) building another c-string, and (iv) if $c_i$ when processed by the Replica algorithm with $b_j$ does not yield a replica of $b_j$ for any j=1,2, . . . (i−1),(i+1), . . . n then the transmitter transmits $c_i$ to the recipient, to communicate to the recipient the letter $a_i$;

the recipient decrypts the transmission received from the transmitter in processing the transmitted $c_i$ against all $b_i$ as the Template, if the transmitted $c_i$ generates one and only one replica among all the b-strings as the Template then the recipient concludes that the A letter associated with this b-string is the plaintext letter corresponding to $c_i$; the letter transmitted by the transmitter;

if the $c_i$ string generates a replica of two or more b-strings then the $c_i$ string is considered a decoy of type I;

any string c that generates no replica with any b-string is considered a decoy string of type II;

the transmitter will send M to the recipient by sending the s A letters in M one by one, each letter $a_i$ sent through the Feed string $c_i$ that points to $b_i$, and is not a decoy of type I, the transmitter, at will, will transmit to the recipient decoys of type I and decoys of type II, (a*) before sending the $c_i$ strings that point to letters in M (b*) between the $c_i$ strings that point to letters in M (c*) after sending the $c_i$ strings that point to letters in M the recipient will discard the decoys of type I and the decoys of type II, resulting in making the Replica cipher decoy tolerant.

2. The method of claim 1 wherein the transmitter generates decoys of type I and decoys of type II, and these decoys are transmitted at a selected fixed rate of information flow, and the transmitter sending message M to the recipient by replacing a decoy string for a c-string pointing to the first letter in M, then replacing a later decoy with the c-string pointing to the second letter in M, repeating until all s letters in M have been interjected into the fixed rate of information flow, which continues at the same fixed rate afterwards.

3. The method of claim 2 where both parties communicating with each other maintain a fixed flow rate of a stream of digital strings to the other party, and inject into their transmission streams the messages they wish to communicate to the other party, the parties implementing a conversation between the parties without projecting the pattern of the conversation, replacing a decoy string with a b-string that points to a letter of the message alphabet A, without affecting the constant bit flow rate from the transmitter to the recipient so that an outside observer receives no indication that a decoy string was replaced by an actual ciphertext letter communication string.

4. The method of claim 1 where parameters are determined by a source of randomness, the source of randomness determining:

in the case of parties in communication with each other randomly determining and sharing parameters:

aa) the size of each of the n b-strings associated with the n letters of the A alphabet, where the size is determined by the number of letters from the transmission alphabet T that comprise the b-strings; the transmitter and the recipient jointly specifying a low limit $b_l$ and a high limit $b_h$ and letting randomness choose a value in between, and bb) the letter content of each of the n b-strings associated with the n letters of the A alphabet, in terms of the identity of the associated T letters and their order;

aaa) the number of g added letters used by the Replica Builder algorithm each time a c-string is built to communicate to the recipient a given letter from message M, where the transmitter will assign a low limit and a high limit for g, and let a randomness source select a value within this range, and bbb) the identity of the g added letters used by the Replica Builder algorithm each time a c-string is built to communicate to the recipient a given letter from a message M, a selected identity is among all the letters that satisfy the Replica Builder procedure;

the aa and bb parameters are shared by the transmitter and the recipient, where the aaa and bbb parameters are determined unilaterally by the transmitter.

5. The method of claim 1 where the transmitter is selecting the successive values of the count of g added letters in the Replica Builder algorithm to build the successive $c_i$ strings for transmitting the message M, in order to communicate a secondary (subliminal) message to the recipient.

6. The method of claim 1 where the transmitter is selecting the identities of the letters added in the Replica Builder algorithm to communicate a secondary (subliminal) message to the recipient.

7. The method of claim 1 where the transmitter will increase the cryptanalytic burden projected by the encoded transmission by increasing the number of decoy strings, type I and type II, mixed with the c-strings that point to letters of the transmitted message.

8. The method of claim 1 where k alphabets $A_1, A_2, \ldots A_k$ are utilized, and each alphabet i for i=1,2, . . . k has $n_i$ letters, with all $L=\Sigma n_i$ letters each associated with a unique b-string comprised of a shared transmission alphabet T, and where k parties are each in possession of the b-strings of one or more alphabet and no other b-strings;

the transmitter sending letter j of alphabet i, $a_{ij}$ to the parties in possession of the b-strings (the encryption/decryption key) for alphabet i which the other parties will interpret as decoy strings and discard, thereby enabling a parallel ciphertext where messages to k recipients are mixed together and each recipient sees only the message intended for them, regarding the rest as decoy strings.

9. A system performing Replica encryption and decryption in a standalone Replica box communicating with a secure computing device (s-comp), a networked computing device (n-comp), as well as with an external source of randomness (RND), the Replica box comprising:

a computer processor;
digital storage;
secure computing device (s-comp) communication ports;
networked computing device (n-comp) communication ports;
a Replica algorithm, executing on the computer processor, further comprising:
a) a message alphabet, A, comprising n letters $a_1$, $a_2$, ...... $a_n$; a transmitted message M comprising a string of s letters from A
b) a transmission alphabet, T, comprising m letters $t_1$, $t_2$, ... $t_m$;
c) a set of b-strings, $b_1$, $b_2$, ... $b_n$ comprising letters of T, where each string $b_i$ is associated with a corresponding letter $a_i$ for i=1,2, ... n;
d) an algorithm named Replica, executing on the computer processor, that generates a replica of a b-string serving as a Template, from a c-string of T letters, designated as the 'Feed', by a pointer pointing to the letters in the c-string by order, and moving some of the c-string letters one by one to a register such that the register holds a replica of the Template, and such that when the last letter of the replica is added to the register, the pointer to the c-string letters reaches the end of the c-string;
e) an algorithm named Replica Builder, executing on the computer processor, that builds a c-string (a Feed) that generates a replica of a given b-string (a Template), the b-string comprising q letters from alphabet T according to the Replica algorithm;
where the Replica Builder algorithm further comprises:
constructing a Replica output c-string by first setting c-string=b-string, which is the initial setting of the c-string that evolves to its final form to become the Feed;
adding an arbitrary number g of T letters to the c-string, one by one, where each of these letters is added by:
the evolving c-string including q letters of T $r_1$, $r_2$, ... $r_g$, where $r_i$ is a letter of the transmission alphabet T for i=1,2, ... q, in its initial T-setting, and
choosing an arbitrary letter $r_i$ for i=1,2, ... (q−1), from the initial T-setting, and injecting between $r_i$ and the next letter $r_{i+1}$ an arbitrary letter from T, $t_j$ where $t_j \neq r_{j+1}$;
resulting in the string c, comprising (q+g) letters that when input to the Replica algorithm as a Feed, with the b-string as the Template, generating the Template replica in the Replica register;
the set of n b-strings $b_1$, $b_2$, ... $b_n$ are regarded as the encryption/decryption key of the Replica algorithm that is shared by a transmitter and a recipient along with the message alphabet A and the transmission alphabet T;
in sending a letter $a_i$ for i=1,2 ... n to the recipient, the transmitter:

(i) uses the Replica Builder algorithm to build a c-string $c_i$ as a Feed that will generate a replica of $b_i$ when processed through the Replica algorithm,
(ii) checks that when $c_i$ is processed by the Replica algorithm with $b_j$ for j=1,2, ... (i−1),(i+1), ... n, that the result is not a replica of $b_j$,
(iii) if $c_i$ when processed by the Replica algorithm with $b_j$ as a Template yields a replica of $b_j$ then the transmitter denotes this string as a decoy string, and repeats step (i) building another c-string, and
(iv) if $c_i$ when processed by the Replica algorithm with $b_j$ does not yield a replica of $b_j$ for any j=1,2, ... (i−1),(i+1), ... n then the transmitter transmits $c_i$ to the recipient, to communicate to the recipient the letter $a_i$;
the recipient decrypts the transmission received from the transmitter in processing the transmitted $c_i$ against all $b_j$ as the Template, if the transmitted $c_i$ generates one and only one replica among all the b-strings as the Template then the recipient concludes that the A letter associated with this b-string is the plaintext letter corresponding to $c_i$; the letter transmitted by the transmitter;
if the $c_i$ string generates a replica of two or more b-strings then the $c_i$ string is considered a decoy of type I;
any string c that generates no replica with any b-string is considered a decoy string of type II;
the transmitter will send M to the recipient by sending the s A letters in M one by one, each letter $a_i$ sent through the Feed string $c_i$ that points to $b_i$, and is not a decoy of type I, the transmitter, at will, will transmit to the recipient decoys of type I and decoys of type II,
(a*) before sending the $c_i$ strings that point to letters in M
(b*) between the $c_i$ strings that point to letters in M
(c*) after sending the $c_i$ strings that point to letters in M
the recipient will discard the decoys of type I and the decoys of type II, resulting in making the Replica algorithm decoy tolerant;
the Replica box accepting outbound plaintext from the s-comp, encrypting the outbound plaintext with the Replica algorithm, obtaining randomness from the external source of randomness, providing a digital output that includes mixing c-strings with decoy strings, and communicating the resultant digital message either directly to a remote recipient via an internet cloud, or via the local n-comp;
the Replica box accepting inbound encrypted messages mixed with decoy strings either directly via the internet cloud or via the n-comp, the Replica box decrypting the inbound encrypted messages, extracting the plaintext, and communicating the extracted plaintext to the s-comp for the recipient.

10. The system of claim 9 where the transmitter indicates to the Replica box the amount of decoy strings to be used for mixing with the c-strings that point to a letter in the communicated message.

* * * * *